United States Patent
Won

(10) Patent No.: US 7,519,387 B2
(45) Date of Patent: Apr. 14, 2009

(54) APPARATUS AND METHOD FOR WIRELESS COUPLING OF INTEGRATED CIRCUIT CHIPS

(75) Inventor: Nara Won, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 460 days.

(21) Appl. No.: 10/735,560

(22) Filed: Dec. 12, 2003

(65) Prior Publication Data
US 2005/0130698 A1     Jun. 16, 2005

(51) Int. Cl.
*H04B 1/38* (2006.01)
*H04M 1/00* (2006.01)

(52) U.S. Cl. .................... 455/550.1; 455/333; 455/551; 455/552.1

(58) Field of Classification Search ............. 455/550.1, 455/333, 334, 73, 91, 108, 102, 226.1, 136, 455/138, 112, 316, 127.3, 252.1, 551, 552.1, 455/553.1, 558, 554.2, 90.1, 142, 41.2, 66.1; 438/63
See application file for complete search history.

(56) References Cited

U.S. PATENT DOCUMENTS

| | | | | |
|---|---|---|---|---|
| 4,989,204 A | * | 1/1991 | Shimizu et al. ............. | 370/328 |
| 5,058,150 A | * | 10/1991 | Kang ....................... | 455/556.1 |
| 6,169,474 B1 | * | 1/2001 | Greeff et al. ............... | 340/10.1 |
| 6,408,195 B1 | * | 6/2002 | Hishiki et al. ............... | 455/574 |
| 7,163,155 B2 | * | 1/2007 | Briancon et al. ............ | 235/492 |
| 2004/0022004 A1 | * | 2/2004 | Habuka et al. .............. | 361/119 |
| 2004/0087279 A1 | * | 5/2004 | Muschallik et al. .......... | 455/73 |
| 2004/0102176 A1 | * | 5/2004 | Hayashi et al. ............. | 455/333 |
| 2005/0003781 A1 | * | 1/2005 | Kunz et al. ............... | 455/226.1 |
| 2006/0293004 A1 | * | 12/2006 | Irie et al. ................. | 455/127.3 |

* cited by examiner

*Primary Examiner*—John J Lee
(74) *Attorney, Agent, or Firm*—Frederick J. Telecky, Jr.; Wade J. Brady, III

(57) ABSTRACT

In order to overcome the limitation of the integrated circuit chip inter-connectability resulting from the physical dimensions of the leads, a radio frequency transmitter and/or a radio frequency receiver are included in the integrated circuit chip. Logic signal groups from one integrated circuit chip can be encoded by the modulation on the radio frequency signal and received and decoded by a second integrated circuit chip. The transmitted signal groups can be transmitted in a series format or in a parallel format. Either amplitude or frequency modulation can be used to impose information on the carrier frequency.

14 Claims, 3 Drawing Sheets

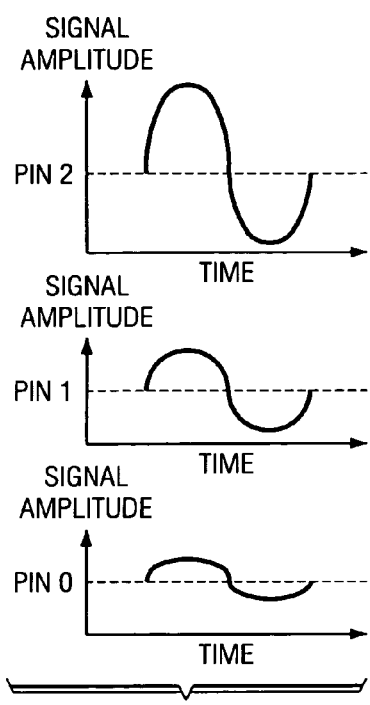
FIG. 5B
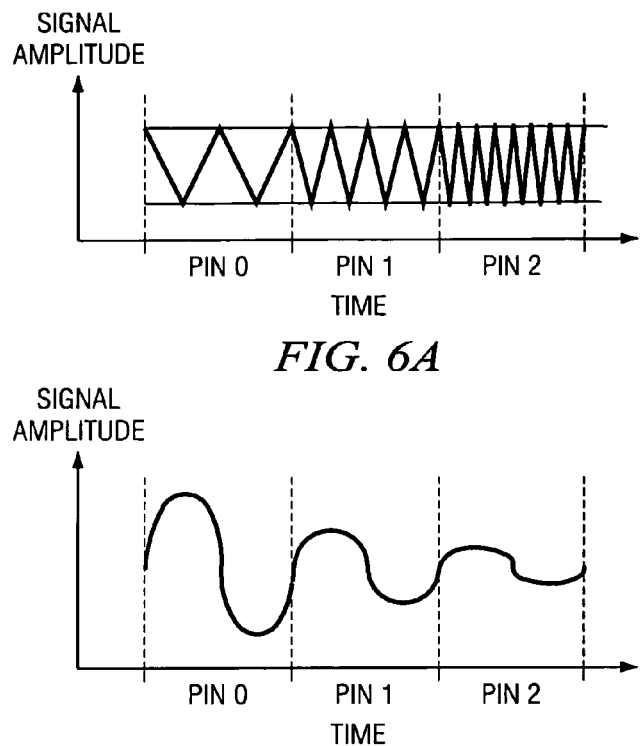
FIG. 6A
FIG. 6B
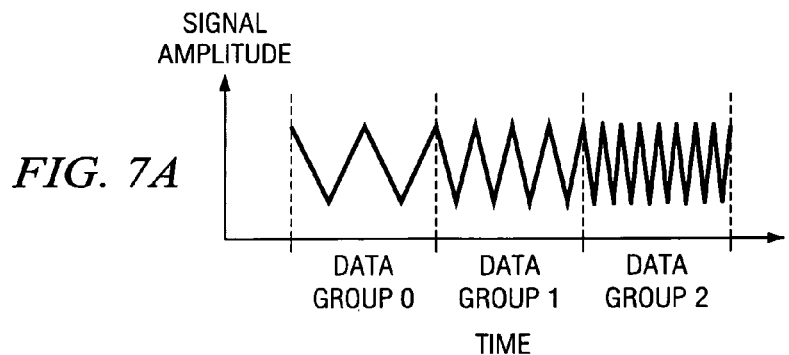
FIG. 7A
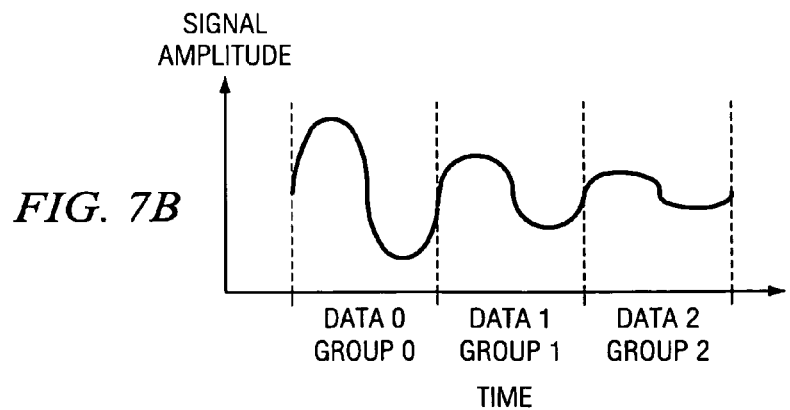
FIG. 7B

APPARATUS AND METHOD FOR WIRELESS COUPLING OF INTEGRATED CIRCUIT CHIPS

BACKGROUND OF THE INVENTION

1. Field of the Invention

This invention relates to integrated circuit chips and, more particularly, to the exchange of signal groups between the integrated circuit chips.

2. Background of the Invention

As the number of components and the density of the components on an integrated circuit chip have increased, the ability to exchange signals between the chips has been an increasing challenge. In addition to the density of components, the width of signal groups, i.e., the number of logic signals generally transferred in parallel, has increased. The leads coupling an integrated circuit chip to external components have been reduced in size so that more electrical conductors can be utilized. As the result of a variety of limitations, the size and density of the integrated circuit chip conducting leads has reached a limit. However, the integrated circuit chips continue to decrease in size and/or in density of components and consequently require additional conducting leads to be coupled to integrated circuit chips that exceed the physical dimensions available.

A need has therefore been felt for apparatus and an associated method having the feature that signals could be exchanged with an integrated circuit chip unlimited by the physical dimensions of the integrated circuit chip. It would yet another feature of the apparatus and related method to exchange signal groups between integrated circuit chips in the absence of conducting paths electrically coupling the integrated circuit chips. It would be a still further feature of the apparatus and associated method to increase the number of signal channels available to an integrated circuit chip.

SUMMARY OF THE INVENTION

The aforementioned and other features are accomplished, according to the present invention, by providing each integrated circuit chip with a radio transmitter and a radio receiver. The radio transmitters and receivers permit data signal groups to be exchanged between the integrated circuit chips. The format of the transmitted signal groups can be serial or parallel. Whatever the format, the signals for the output pins of the transmitting integrated circuit chip are associated with the receiving pins of receiving integrated circuit chip. The power necessary to transmit the data can be minimized by the relative positioning of the integrated circuit chips.

Other features and advantages of the present invention will be more clearly understood upon reading of the following description and the accompanying drawings and claims.

BRIEF DESCRIPTION OF THE DRAWINGS

FIG. 5A illustrates the demodulated signals for frequency-modulated, parallel transmission of signals between integrated circuit chips, while FIG. 5B illustrates the demodulated signals for amplitude-modulated, parallel transmission signals between integrated circuit chips according to the present invention.

FIG. 6A illustrates demodulated signals for frequency-modulated serial transmission of signals between integrated circuit chips, while FIG. 5B illustrates demodulated signals for amplitude-modulated serial transmission of signals between integrated circuit chips according to the present invention.

FIG. 7A illustrates demodulated signals for frequency-modulated encoded signals transferring signal groups between integrated circuit chips, while FIG. 7B illustrates decoded signal for amplitude-modulated encoded signals transferring signal groups between integrated circuit chips according to the present invention.

DESCRIPTION OF THE PREFERRED EMBODIMENT

1. Detailed Description of the Drawings

Figure 1:
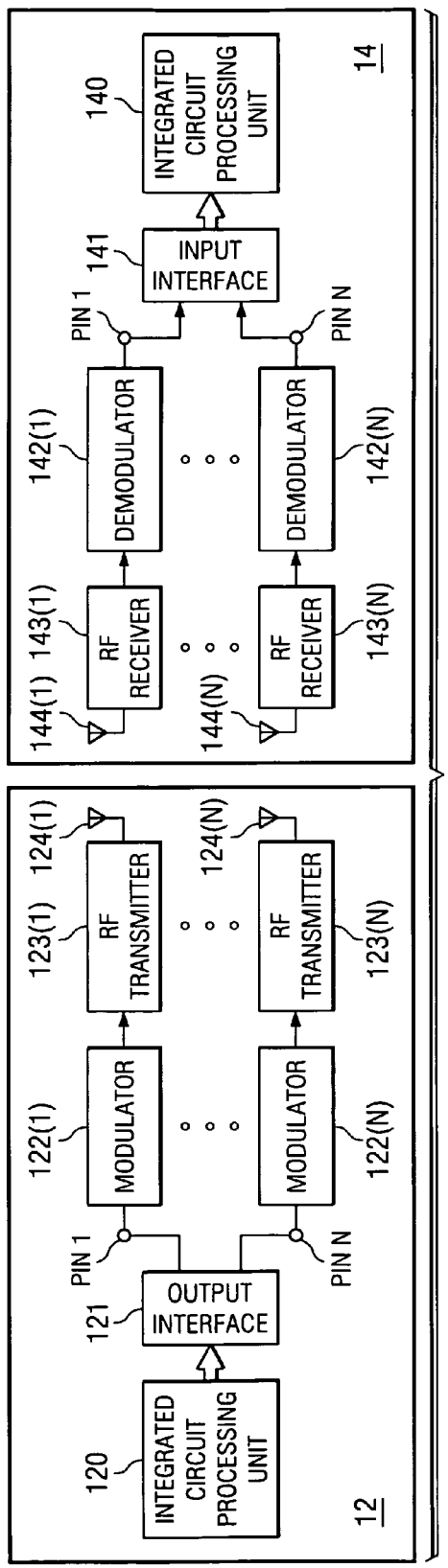
FIG. 1 is a block diagram of a first implementation for the transfer of signal groups from a first integrated circuit chip to a second integrated circuit chip according to the present invention is shown.

Referring to FIG. 1, a block diagram of a first implementation for radio frequency transmission of signal groups from a first integrated circuit chip 12 to a second integrated circuit chip 14 is shown. The apparatus for transmitting each signal of a signal group separately between integrated circuit chips 12 and 14 using radio frequency techniques is illustrated according to the present invention. Output signals from an integrated circuit chip processing unit 120 are applied to an interface unit 121. The individual signals from a signal are applied to modulator 122(1) through 122(N). The output signals from modulators 122(1) though 122(N) are applied to rf transmitters 123(1) through 123(N), respectively. The output signals from rf transmitters 123(1) through 123(N) are applied to antennas 124(1) through 124(N), respectively. The transmitted signals from antennas 124(1) through 124(N) are received by antennas 144(1) through 144(N). The signals received by antennas 144 (1) through 144(N) and applied to rf receivers 143(1) through 143(N), respectively. The output signals from rf receivers 143(1) through 143(N) are applied to demodulators 142(1) through 142(N) respectively. The output signals from demodulators 142(1) through 142(N) are applied to input interface 141. The output signals from the input interface 141 are applied to integrated circuit processing unit 140.

Figure 2:
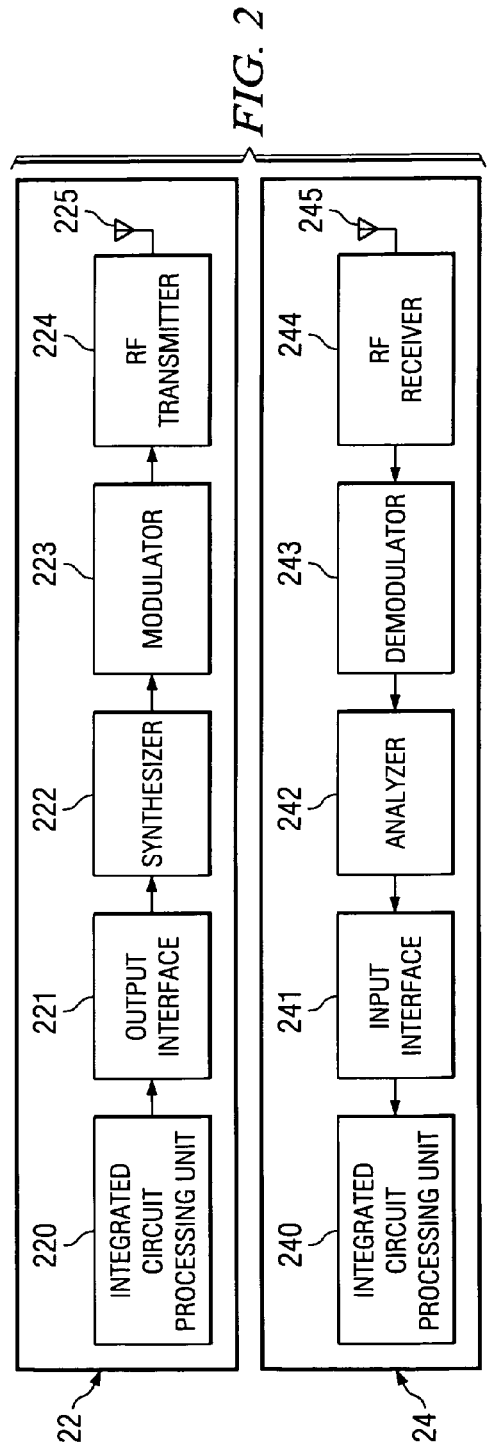
FIG. 2 is a block diagram of a second implementation for the transfer of signal groups from a first integrated circuit chip to a second integrated circuit chip according to the present invention is shown.

Referring to FIG. 2, a block diagram for a second implementation for radio frequency transmission of signal groups from a first integrated circuit chip 22 to a second integrated circuit chip 24 is shown. The first integrated circuit processing unit 220 applies signal groups to output interface 221. The output interface 221 applies signal groups to the synthesizer 222. The output signals of the synthesizer 222 are applied to modulator 223. The output signals from the modulator 223 are applied to rf transmitter 224. The output signals from rf transmitter 221 are applied to antenna 225. The rf signals broadcast by antenna 225 are received by antenna 245. The signals from antenna 245 are applied to rf receiver 244. The output signals from rf receiver 244 are applied to demodulator 243. The out put signals from the demodulator 243 are applied to the analyzer 242. The output signals from the analyzer are applied to input interface 241 and the signal groups from the input interface 241 are applied to integrated circuit processing unit 240.

Figure 3:
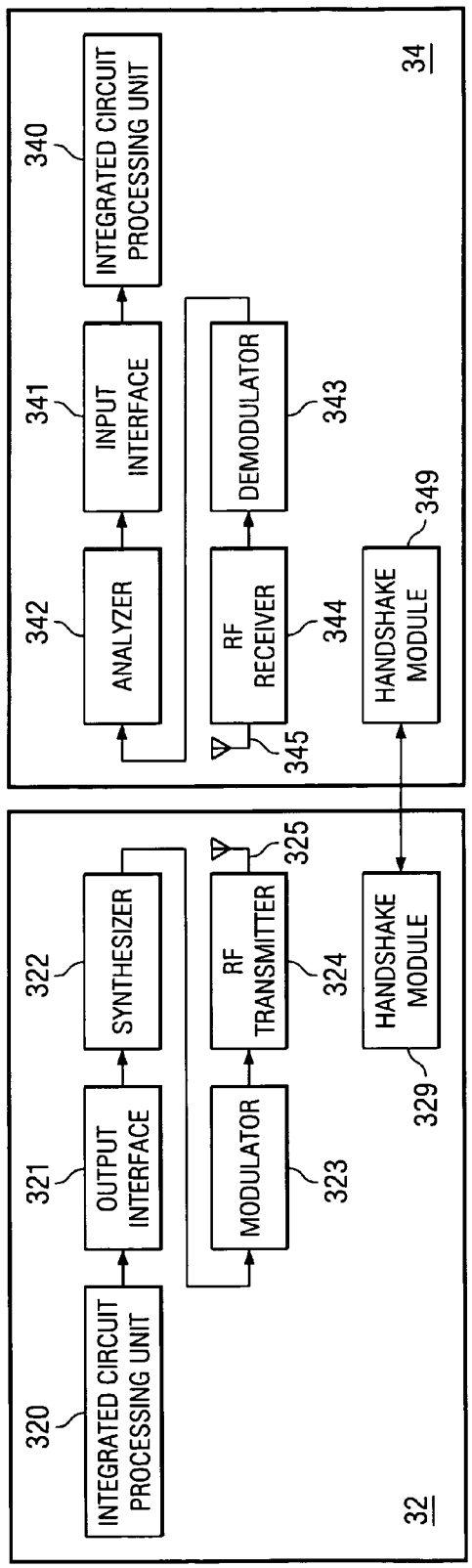
FIG. 3 is a block diagram of a third implementation for the transfer of signal groups from a first integrated circuit chip to a second integrated circuit chip according to the present invention is shown.

Referring to FIG. 3, a block diagram for a third implementation for the radio frequency transmission of signal groups from a first integrated circuit chip 32 to a second integrated circuit chip 34. Signal groups from integrated circuit processing unit 320 are applied to output interface 321. The output signals from output interface 321 are transferred through synthesizer 322, through modulator 323, and through rf transmitter 321 to antenna 325. The radio frequency transmissions from antenna 325 are received by antenna 345. The signals from antenna 345 are applied through rf receiver 344, through demodulator 343, through analyzer 342, and through input interface 341 to integrated circuit processing unit 340. In addition, integrated circuit chip 32 includes a handshaking module 329 that is coupled to a handshaking module 349 on circuit board 34.

Figure 4:
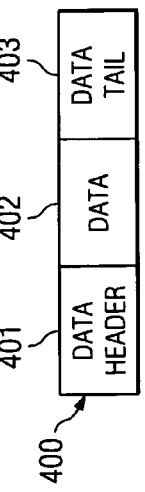
FIG. 4 illustrates the signal group format for a serial or parallel transmission of signal groups.

Referring to FIG. 4, a format for transmission of data signal packets is 400 is shown. The data packets 400 include a data header 401, the data 402, and the data tail 403. The header and tail can include error correction and handshaking information.

Figure 5A:
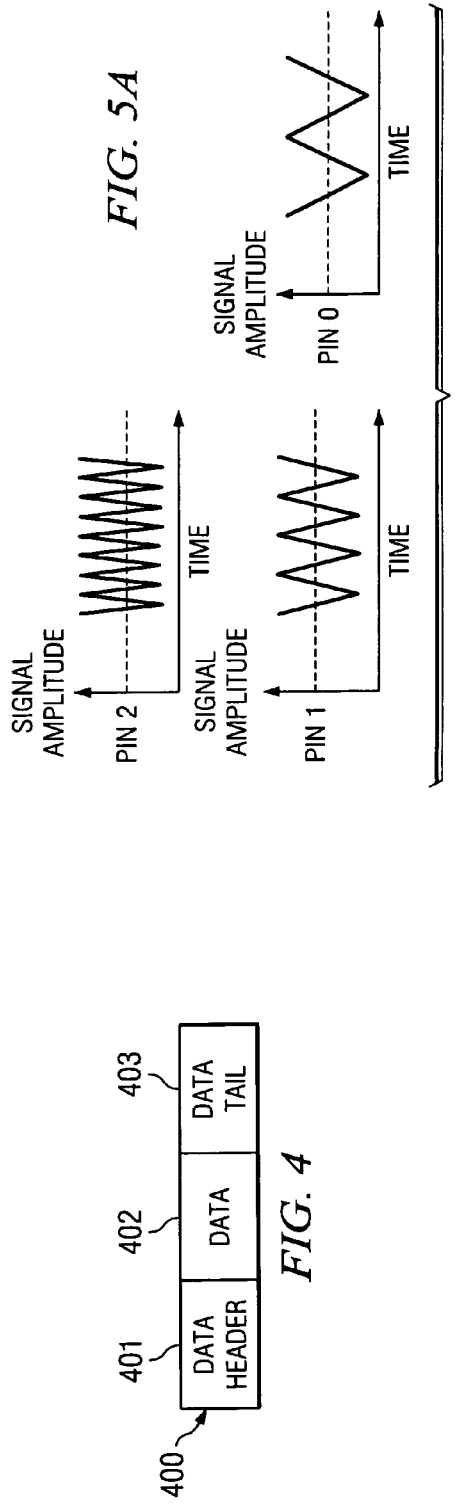

Referring to FIGS. 5A and 5B, the demodulated signals for each pin for a parallel transmission of a frequency-modulated and amplitude modulated signals, respectively, are illustrated. In these embodiments, a separate transmitter is provided for each pin in the first integrated circuit and a receiver is provided for each pin in the second integrated circuit. The transmitters and receivers are arranged so that information is transferred between corresponding pins. The modulation on the carrier wave can be either frequency-modulated as illustrated FIG. 5A or can be amplitude modulated as illustrated in FIG. 5B.

Referring to FIG. 6A and FIG. 6B, the demodulated signals a serial transmission of frequency-modulated and amplitude-modulated signals, respectively, are illustrated. In this embodiment, the signals applied to a set of pins are transmitted by one transmitter/receiver combination. In the frequency-modulated example, the presence of a demodulated signal having a preselected frequency identifies the logic state on a pin associated with that preselected frequency. In other words, each pin has a frequency associated therewith and the identification of a signal having that that defines to the receiving integrated circuit chip the presence of logic state on the corresponding pin in the transmitting unit. Similarly, in the amplitude-modulated serial embodiment, the signal of a preselected amplitude is associated with a logic state of an associated pin. In this manner, the logic signals associated with a group of pins in a first integrated circuit chip can be transferred to conducting paths of associated pins in a second integrated circuit chip.

Referring to FIG. 7A and FIG. 7B, decoded signals identifying preselected signal groups for frequency-modulated and amplitude-modulated data groups, respectively, are illustrated. In these embodiments, the signals from a group of pins re applied to a synthesizer. The synthesizer correlates the signals applied to the pins, i.e., the pattern of signals, with a single frequency or amplitude. In the receiving integrated circuit chip, the analyzer identifies the frequency or amplitude and reconstructs the pattern of signals and applies this pattern of signals to the pins of the associated pins of the receiving integrated circuit. Viewed in another manner, this embodiment can be viewed as transferring parallel signal groups in a serial encoded signal transmission.

As will be clear, some technique for independent synchronization may be implemented. In the presence of independent synchronization between the transmitting unit and the receiving unit, the less complicated logic signal and no logic signal transmission technique can be utilized.

2. Operation of the Preferred Embodiment

The present invention provides for the exchange of signal groups between integrated circuit chips using radio frequency signals rather than electrical conductors is shown. The invention is facilitated by technology that permits the components implementing transfer of the radio frequency signals to be a relatively small portion of an integrated circuit device. This method of exchanging logic signals between integrated circuit chips can be used as the sole method of signal exchange or can be used to augment the use of conducting leads to exchange signals.

An interface unit is needed to buffer the signal groups being transmitted and the signal groups being received. The synthesizer and analyzer units are needed to reformat the signals in the more complex signal exchange modes.

As will be clear, the present invention finds use in transmission of signals between integrated circuits chips positioned on the same board. In addition, the transmission/receiving technique of the present invention can be used between integrated circuit chips on different boards. One particularly useful configuration is the stacking of circuit boards wherein the transmitting unit and the receiving unit are in close proximity.

While the invention has been described with respect to the embodiments set forth above, the invention is not necessarily limited to these embodiments. Accordingly, other embodiment variations, and improvements not described herein, are not necessarily excluded from the scope of the invention, the scope of the invention being defined by the following claims.

What is claimed is:

1. An integrated circuit board, the board comprising:
a multiplicity of semiconductor chips for processing signal groups, wherein a plurality of semiconductor chips exchange signal groups with each other using wireless techniques, the multiplicity of semiconductor chips including:
a first semiconductor chip on the circuit board operable to wirelessly receive a signal group from a second semiconductor chip on the circuit board, the first semiconductor chip having:
an antenna for receiving wireless signals transmitted from the second semiconductor chip;
a wireless signal receiver coupled to the antenna, the receiver operable to detect the wireless signals; and
a demodulator coupled to the receiver, the demodulator operable to recover the signal group from the wireless signals.

2. The integrated circuit board as recited in claim 1 wherein signals received by the wireless signal receiver are modulated with a modulation from the group consisting of amplitude modulation and frequency modulation.

3. The integrated circuit board as recited in claim 1, wherein the first semiconductor chip further includes an analyzer, the analyzer operable to receive the signal group from the demodulator and to decode the signal group into a plurality of logic signals.

4. The integrated circuit board as recited in claim 1 wherein the wireless signals include a header portion, a data portion, and a tail portion.

5. A method for transferring logic signal groups between semiconductor chips located on a same board, the method comprising:

modulating and transmitting a wireless signal by a first semiconductor chip located on the board, the wireless signal being modulated with a logic signal group generated by the first semiconductor chip; and receiving and demodulating the wireless signal by a second semiconductor chip located on the same board to reproduce the logic signal group for use by the second semiconductor chip.

6. The method as recited in claim 5 wherein the wireless signal transmits signal groups formatted in a serial format.

7. The method as recited in claim 5 wherein the wireless signal transmitting the signal groups is modulated with a modulation selected from the group consisting of amplitude modulation and frequency modulation.

8. The method as recited in claim 5 wherein the wireless signal comprises an encoded pattern of signals produced by the first semiconductor chip.

9. The method as recited in claim 8 wherein the receiving and demodulating of the wireless signal provide a decoded signal representing the pattern of signals produced by the first semiconductor chip.

10. A system for transferring data signal groups between semiconductor chips located in close proximity, the system comprising:

a first semiconductor chip comprising:
a first processing unit; and
a wireless transmitting unit coupled to the first processing unit and operable to receive a signal group therefrom, the wireless transmitting unit coupled to an antenna within the first semiconductor chip and operable to wirelessly transmit the signal group from the first processing unit; and a second semiconductor chip located in close proximity to the first semiconductor chip, the second semiconductor chip comprising:
a second processing unit; and
a wireless receiving unit coupled to the second processing unit, the wireless receiving unit coupled to an antenna within the second semiconductor chip and operable to receive the signal group from the transmitting unit and to provide the signal group to the second processing unit.

11. The system as recited in claim 10 wherein the first semiconductor chip further comprises a synthesizer and the second semiconductor chip further comprises an analyzer for processing a serially transmitted signal group.

12. The system as recited in claim 10 wherein the first semiconductor chip is located on a first circuit board and the second semiconductor chip is located on a second circuit board, the first circuit board and the second circuit board being in a stacked configuration in close proximity.

13. The system as recited in claim 10 wherein the first semiconductor chip and the second semiconductor chip are positioned on a same board.

14. The system as recited in claim 10 wherein the transmitted signal group includes a header portion, a data portion and a tail portion.

* * * * *